Dec. 4, 1962     M. H. CONIL     3,066,902

FASTENING DEVICE

Filed June 30, 1960     3 Sheets-Sheet 1

Inventor:
MARIUS H. CONIL, by Joseph Y. Houghton

Atty.

Dec. 4, 1962 M. H. CONIL 3,066,902
FASTENING DEVICE
Filed June 30, 1960 3 Sheets-Sheet 2
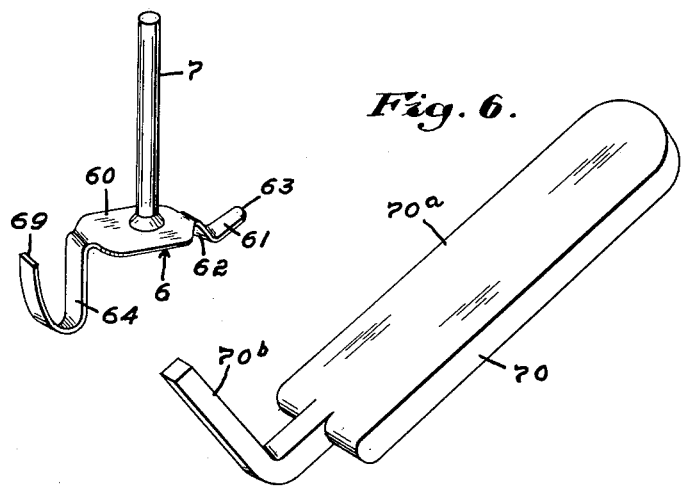
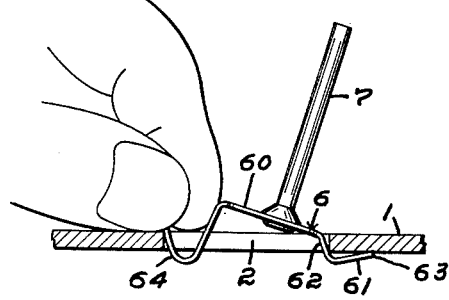
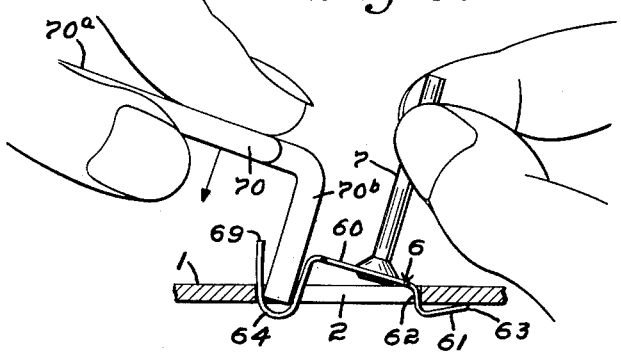
Inventor:
MARIUS H. CONIL
by
Atty.

Dec. 4, 1962  M. H. CONIL  3,066,902
FASTENING DEVICE
Filed June 30, 1960  3 Sheets-Sheet 3
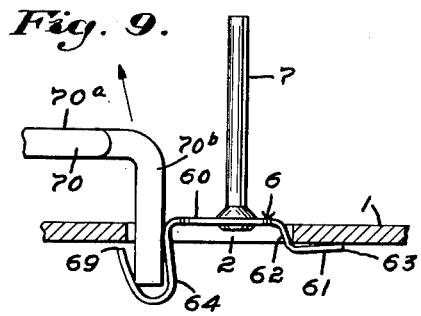
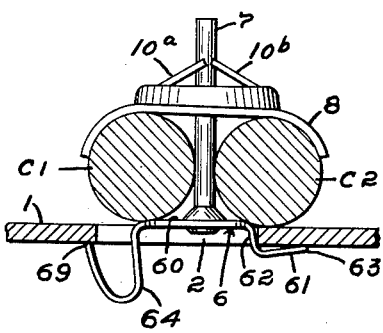
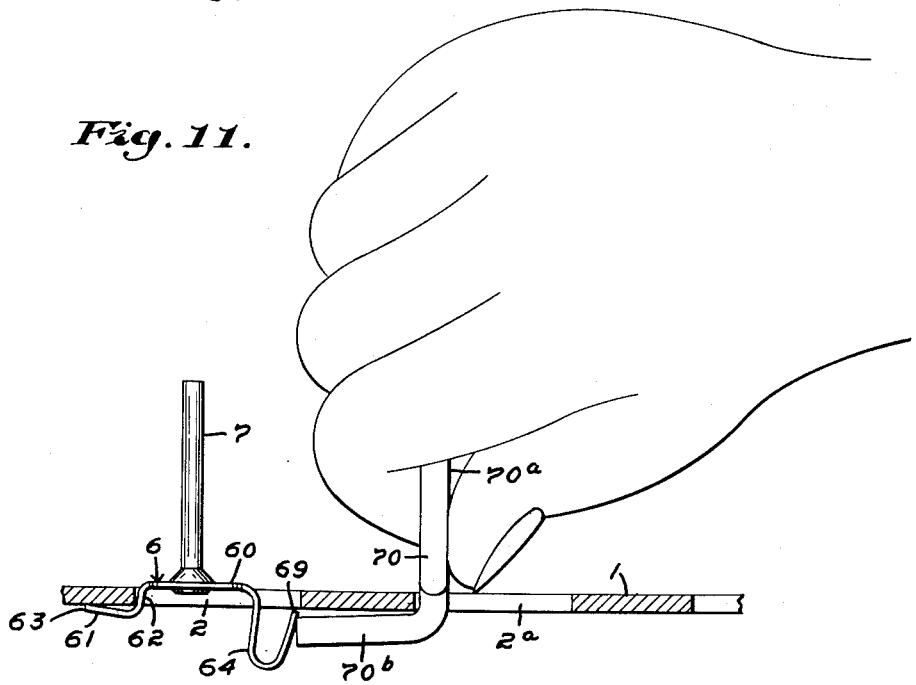
Inventor:
MARIUS H. CONIL.
by
Atty.

United States Patent Office 3,066,902
Patented Dec. 4, 1962

3,066,902
FASTENING DEVICE
Marius Hippolyte Conil, Grenoble, France, assignor to A. Raymond, Grenoble, France, a firm
Filed June 30, 1960, Ser. No. 40,017
1 Claim. (Cl. 248—223)

The subject of this application is a device for removable attachment of elements, such as electrical cables, on supports, in particular on bars or profile irons comprising elongated openings.

In one method of embodiment of the invention this attachment device comprises an elastic pincer or hook on which is fixed a pin and which is engaged in an opening in the support. The cables to be fixed are disposed on either side of the pin and held in place by a bracket having an opening through which passes the pin as well as elastic tabs which are arched on the latter.

The subject of the present application is a new embodiment of the elastic pincers designed for attachment devices of this type.

The conformation of this pincer was drawn up in such a way as to permit an easy mounting and dismounting of the latter in all positions.

The following description with reference to the attached drawings, given by way of non-limiting example, will make it easy to understand how the invention can be embodied, the characteristics appearing in both the drawing and the text are, of course, part of the said invention.

FIG. 5 is a perspective view representing a variation of embodiment of the hook;

FIG. 6 is a perspective view of a tool permitting the mounting and dismounting of the hook;

FIGS. 7 to 9 are views in schematic section illustrating the installation of the hook;

FIG. 10 is an analogous view showing the assembly of the attachment device comprising the hook in FIGS. 5 to 8;

FIG. 11 is a view in schematic section showing how we can dismount the hook by means of the tool shown in FIG. 6.

Figure 1:
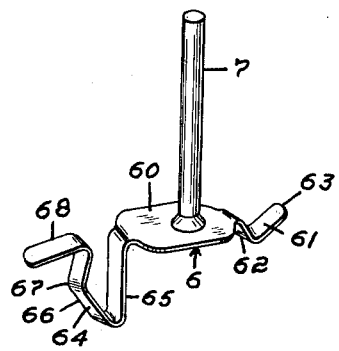
FIG. 1 is a perspective view of a pincer or hook according to the present invention.
Figure 2:
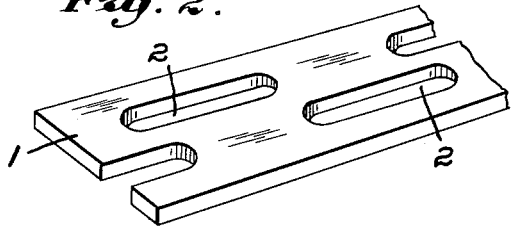
FIG. 2 is an analogous view of a fragment of the support.

The elastic pincer or hook 6 represented in FIGS. 1 to 4, was designed in such a way that it can be attached without difficulty on a support of the type shown in FIG. 2, that is to say, one constituted by a bar, sheet metal or profile iron 1, provided with elongated openings or buttonholes 2.

This hook comprises a central body 60 which is wider than the buttonholes 2, and on which is attached, for example riveted, the pin 7. Preferably, this pin is slightly ecentric with respect to the body 60.

At the end of this body closest to the pin there is a tab 61, whose inner portion 62 is inclined with respect to the body at an obtuse angle to the lower face (opposite the pin) of this body, while the end 63 is raised at almost a right angle with respect to the first.

The width of the tab is less than the width of the openings 2. On the contrary, the length of portion 62 is slightly greater than the thickness of the support.

The other end of the body 60 presents a tab 64 also of less width than the openings 2. This tab comprises an internal portion 65 oriented at approximately right angles to the body 60 below the latter, then a portion 66, raised upward in such a way as to form, with the first, a sort of loop presenting a boss 67. It terminates in a portion 68 folded outward approximately in the extension of the body 60, but preferably pointing slightly downward.

The peak of the boss 67 is situated at a distance below the portion 68 above the thickness of the support, while the distance separating this peak 67, from the portion 62 of the other tab is slightly greater than the useful width of the openings 2 in the support.

The installation of the hook just described is extremely simple.

Figure 3:
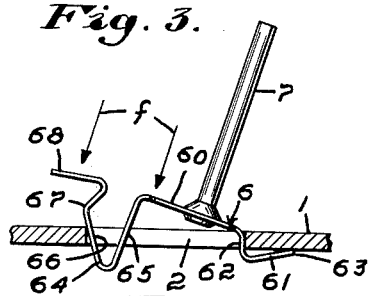
FIG. 3 is a view in section showing how the hook is put into place.
Figure 4:
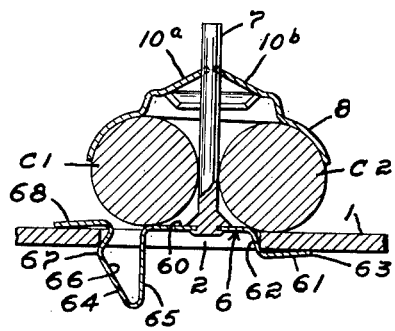
FIG. 4 is a view analogous to the preceding showing the assembly of the attachment device.

As a matter of fact, as shown in FIG. 3, it is sufficient to engage the portion 63 of the tab 61 under one of the ends of an opening 2, the loop of tab 64 then engaging in the other end of the opening, then resting on the portion 68 of the tab 64 and on the body 60 in the direction indicated by arrows f, to elastically engage the boss 67 under the end of the opening.

The cables C1, C2 are held in place by a suitable bracket 8 (FIG. 4) presenting tabs 10a and 10b for engagement with the pin 7, as will be well understood by anyone skilled in the art.

To remove the hook it is enough to push pin 7 in the opposite direction to the movement of assembly.

In the variation shown in FIGS. 5 to 11, the hook 6 has been designed in such a way as to insure a more certain fixation to support 1.

For this purpose the tab 64 is simply folded into the form of a U. Its end 69 terminates slightly below the level of the lower surface of the body 60 and the distance separating the portion 62 from the tab 61 of the end 69 is slightly greater than the useful length of the openings 2 in support 1.

The installation of the hook is simple and easy.

As shown in FIG. 7 we engage tab 61 under one of the ends of opening 2, in the support and insert tab 64 in the other end.

To complete installation of the hook it is preferable to use a tool 70, of the type shown in FIG. 6, that is to say, one having a handle 70a, prolonged by a squared piece 70b, which is not as wide as the openings 2. This tool can easily be made by cutting and folding a flat bar of steel.

In order to pass the whole of tab 64 through the opening in the support, we engage the ferrule 70b of the tool in the loop constituted by the tab and, guiding, as necessary, the hook by action on shaft 7, we push tab 64 through the opening (FIG. 8).

When the tab has passed all the way through, we withdraw the tool (FIG. 9) and the end 69 of the tab then abuts elastically under the support, holding the hook solidly in place.

To disengage the hook (FIG. 11) it is enough to push back the end 69 of tab 64 by means of the tool ferrule, engaging the latter in the opening 2a adjacent to opening 2 in which the hook is mounted. Naturally, the length of the ferrule of the tool should be selected in consequence.

The attachment insured by this second method of embodiment is more secure and, in particular, we cannot disengage the hook by simple traction on rod 7, as in the preceding method of embodiment.

It goes without saying that modifications can be imparted to the methods of embodiment just described, in particular by substitution of equivalent technical means, without thereby departing from the scope of the present invention.

I claim:

A hook-on snap fastening device of the class described comprising, in combination, a hook member having a body portion and a pin member attached to said body portion and extending therefrom in one direction for engagement with a cable holding bracket and said hook member having an integral support engaging hook-like tab of less width than the body portion adjacent to one end and an integral yieldable loop portion at an opposite end, said loop portion comprising a first portion in angular relationship to said body portion and a second portion integral with said first portion in angular relationship therewith extending in substantially the same direction as said pin and having a shoulder and a terminal portion in integral angular relationship with said second portion and lying on substantially the same plane as said body portion, whereby said terminal portion and elements of said second portion engage parts of a support therebetween, and the hook-like portion has a support engaging end portion spaced below the plane of the terminal portion of the yieldable loop portion.

References Cited in the file of this patent

UNITED STATES PATENTS

| | | |
|---|---|---|
| 1,307,240 | Christopher | June 17, 1919 |
| 1,416,969 | O'Conner | May 23, 1922 |
| 1,959,096 | Fernberg | May 15, 1934 |
| 2,517,411 | Patterson | Aug. 1, 1950 |
| 2,961,724 | Alling | Nov. 29, 1960 |